United States Patent
Wang et al.

(10) Patent No.: US 11,228,993 B2
(45) Date of Patent: Jan. 18, 2022

(54) COORDINATED SYNCHRONIZATION AMONG ROAD SIDE SYNCHRONIZATION DEVICES

(71) Applicant: QUALCOMM Incorporated, San Diego, CA (US)

(72) Inventors: Xiao Feng Wang, San Diego, CA (US); James Alan Misener, Pacifica, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 16/775,861

(22) Filed: Jan. 29, 2020

(65) Prior Publication Data
US 2020/0260394 A1   Aug. 13, 2020

Related U.S. Application Data

(60) Provisional application No. 62/802,681, filed on Feb. 7, 2019.

(51) Int. Cl.
*H04W 56/00* (2009.01)
*H04W 4/40* (2018.01)
(Continued)

(52) U.S. Cl.
CPC ......... *H04W 56/001* (2013.01); *G01S 19/425* (2013.01); *H04W 4/40* (2018.02); *H04W 72/0446* (2013.01); *H04W 92/18* (2013.01)

(58) Field of Classification Search
CPC ....... A61B 5/002; A63F 13/30; B60R 16/023; B64C 13/503; B64C 39/024; B64D 11/0015; E21B 47/12; G01S 19/425; G01V 1/22; G05B 19/4185; G05D 1/00; G07C 5/00; G08B 25/00; G08G 5/00; H04B 1/202; H04B 7/18506; H04J 3/06; H04L 7/00; H04L 12/2803; H04L 67/00; H04L 67/104; H04L 67/12; H04L 67/125; H04L 67/18; H04M 11/002; H04M 11/007; H04M 11/04; H04W 4/40; H04W 4/42–48;
(Continued)

(56) References Cited

U.S. PATENT DOCUMENTS 10,708,874 B2 * 7/2020 Wakabayashi ...... H04W 56/002
10,925,026 B2 * 2/2021 Li ........................ H04B 7/2125
(Continued)

OTHER PUBLICATIONS

International Search Report and Written Opinion—PCT/US2020/015918—ISA/EPO—dated May 18, 2020.
(Continued)

*Primary Examiner* — Thomas R Cairns
(74) *Attorney, Agent, or Firm* — Procopio, Cory, Hargreaves & Savitch LLP

(57) ABSTRACT

A method, apparatus, and computer-readable medium are provided for wireless communication at a Road Side Synchronization Device (RSSD). The RSSD receives, from a first neighbor device, a first Sidelink Synchronization Signal (SLSS). The RSSD synchronizes in time/frequency with the first neighbor device, and transmits a second SLSS. The second SLSS is based on a synchronized timing and a synchronized frequency with the first neighbor device.

30 Claims, 11 Drawing Sheets

(51) Int. Cl.
*G01S 19/42* (2010.01)
*H04W 72/04* (2009.01)
*H04W 92/18* (2009.01)

(58) Field of Classification Search
CPC . H04W 56/001; H04W 56/0015–0025; H04W 56/0045; H04W 72/0446; H04W 84/18; H04W 92/18
See application file for complete search history.

(56) References Cited

U.S. PATENT DOCUMENTS

2017/0289935 A1 10/2017 Yoon
2018/0234928 A1 8/2018 Yasukawa et al.
2021/0250881 A1* 8/2021 Lee .................. H04W 72/1278

OTHER PUBLICATIONS

Samsung: "On Synchronization Mechanisms for NR V2X", 3GPP Draft; R1-1901049 on Sync Mechanism-Samsung, 3rd Generation Partnership Project (3GPP), Mobile Competence Centre ; 650, Route Des Lucioles ; F-06921 Sophia-Antipolis Cedex ; France, vol. RAN WG1, No. Taipei, Taiwan 20190121-20190125, Jan. 20, 2019 (Jan. 20, 2019), 9 Pages, XP051593894.
Item 2 Continued Retrieved from the Internet:URL: http://www.3gpp.org/ftp/Meetings%5F3GPP%5FSYNC/RAN1/Docs/R1%2D1901049%2Ezip [retrieved on Jan. 20, 2019], paragraph [Section:3.1].

* cited by examiner

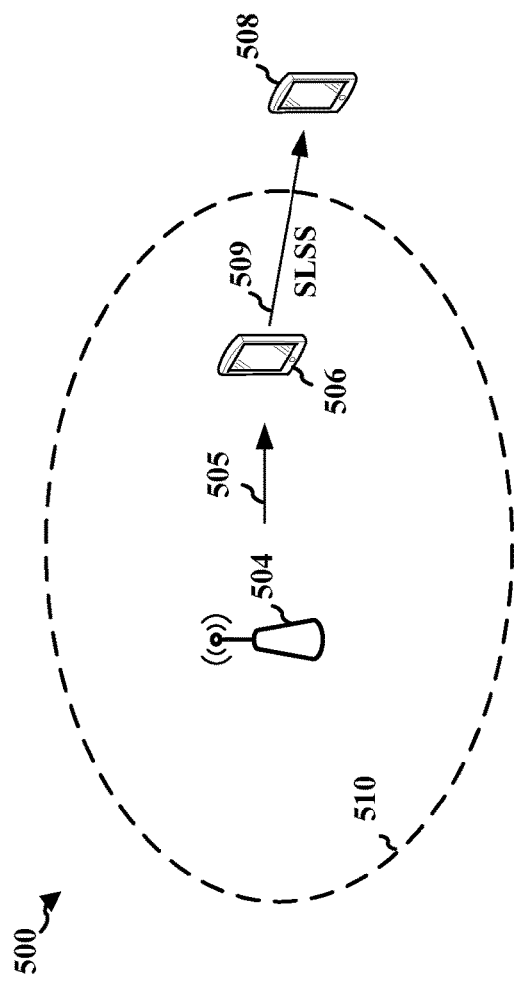
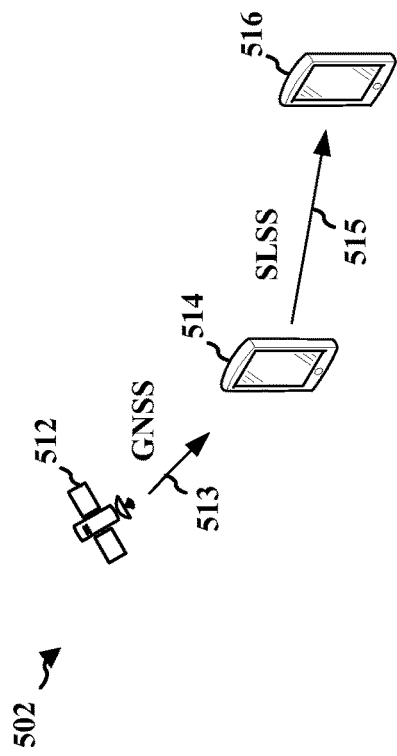
FIG. 5A
FIG. 5B

COORDINATED SYNCHRONIZATION AMONG ROAD SIDE SYNCHRONIZATION DEVICES

CROSS REFERENCE TO RELATED APPLICATION(S)

This application claims the benefit of U.S. Provisional Application Ser. No. 62/802,681, entitled "Coordinated Synchronization Among Road Side Synchronization Devices" and filed on Feb. 7, 2019, which is expressly incorporated by reference herein in its entirety.

BACKGROUND

Technical Field

The present disclosure relates generally to communication systems, and more particularly, to vehicle-to-vehicle (V2V), vehicle-to-everything (V2X), or other device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or other D2D communication. The present disclosure provides improvements in V2X, V2V, and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a Road Side Synchronization Device (RSSD). An RSSD apparatus receives, from a first neighbor device, a first Sidelink Synchronization Signal (SLSS). The RSSD synchronizes in time/frequency with the first neighbor device, and transmits a second SLSS. The second SLSS is based on a synchronized timing and a synchronized frequency with the first neighbor device. An RSSD apparatus may be implemented in a standalone device or as part of a road-side unit (RSU).

To the accomplishment of the foregoing and related ends, the one or more aspects comprise the features hereinafter fully described and particularly pointed out in the claims. The following description and the annexed drawings set forth in detail example illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A and 5B illustrate examples of SLSS communication between User Equipment.

DETAILED DESCRIPTION

Figure 1:
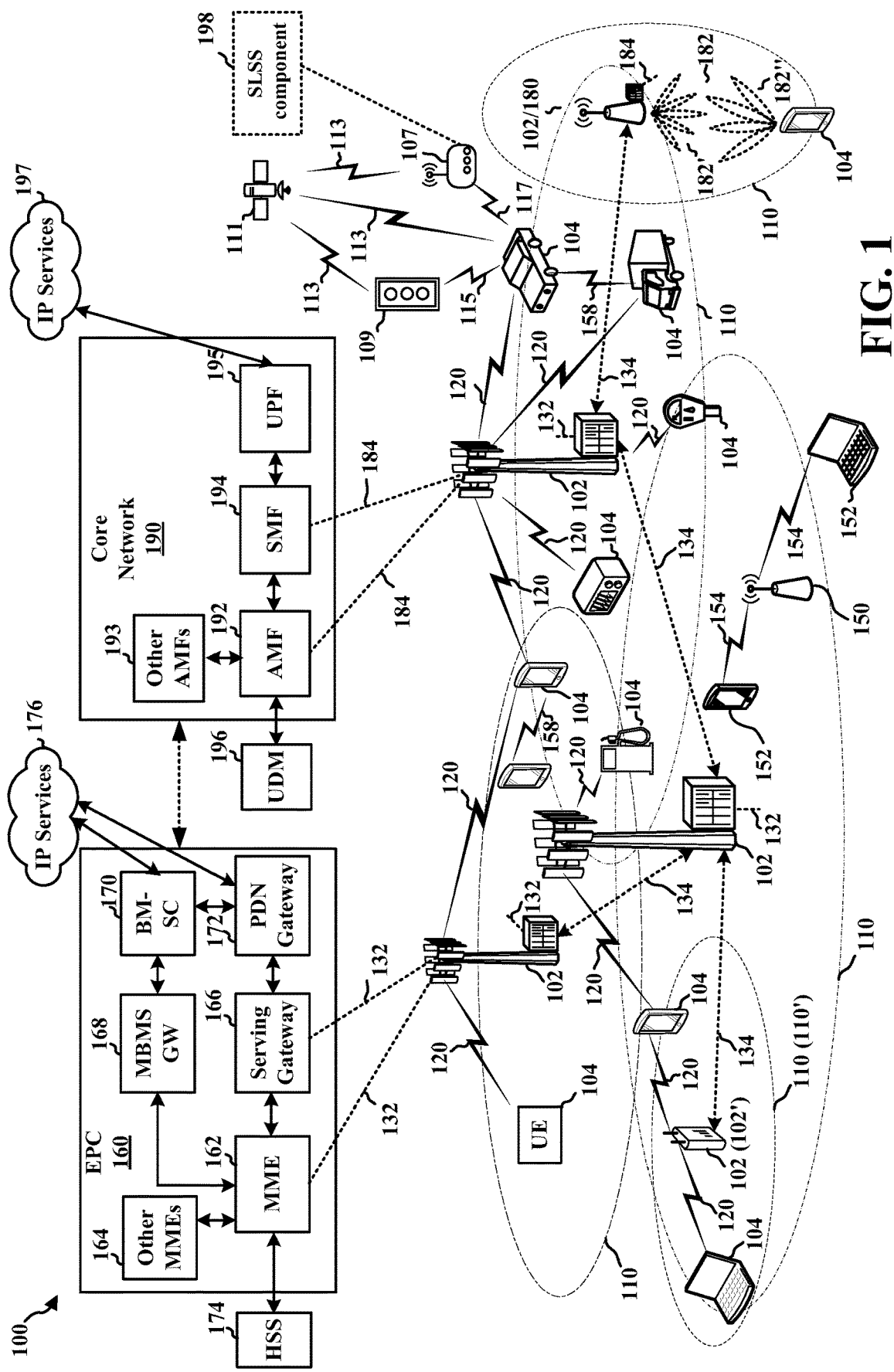
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, e.g., the base station 180, may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, communication may also be transmitted and received directly between UEs 104, such as between a Vehicle User Equipment (VUE), Road Side Unit (RSU) 107, or other UE. The communication may be based on V2V, V2X, or other D2D communication, such as Proximity Services (ProSe). Aspects of the communication may be based on PC5 or sidelink communication. Some wireless communication networks include vehicle-based communication devices that can communicate from vehicle-to-vehicle (V2V), e.g., as illustrated at 158; vehicle-to-RSU, as illustrated at 109; vehicle-to-infrastructure (V2I) (e.g., from the vehicle-based communication device to road infrastructure nodes 109), as illustrated at 115; vehicle-to-network (V2N) (e.g., from the vehicle-based communication device to one or more network nodes, such as a base station), e.g., as illustrated at 120; or a combination thereof along with other devices, which can be collectively referred to as vehicle-to-anything (V2X) communication. V2X communication may include cellular-vehicle-to-everything (C-V2X) communication. Referring again to FIG. 1, in some aspects, a UE 104, e.g., a transmitting Vehicle User Equipment (VUE) or other UE, may be configured to transmit messages directly to another UE 104. The communication may be based on V2X or other D2D communication, such as ProSe, etc. V2X communication or other D2D communication may also be transmitted and received by other transmitting and receiving devices, such as Road Side Unit (RSU) 107, etc. Aspects of the communication may be based on PC5 or sidelink communication e.g., as described in connection with the example in FIG. 2.

In an example, referring to the V2X or other D2D communication between the devices (e.g., over a sidelink channel of communication link 158) may be based on 3GPP LTE. Although examples may be provided for V2X or other D2D communication in connection with LTE, the concepts described herein may be applicable to other technologies such as V2X or other D2D communication based on 5G NR, LTE-A, CDMA, GSM, and other wireless technologies. In one example, LTE may support V2X communications (which may be referred to as "LTE-V2X") for safety messages communicated between vehicles and/or from vehicles to infrastructure, among other uses. As another example, an NR communication, such as 5G NR, may also support V2X (which may be referred to as "NR-V2X") for communications related to autonomous driving, among other uses.

In V2X communications, communication devices can communicate with one another and/or with infrastructure devices over a sidelink channel. Support of synchronization using synchronization signal blocks (SSBs) within synchronization signal bursts may be provided in communication technologies over the Uu interface (e.g., from base station 102/180 to user equipment (UE) 104). In this regard, the UE 104 may receive SSBs and synchronize with the base station 102/180 for network communication and for V2X communication. In V2X or other D2D communications, however, the UEs 104 may be out of range of a base station 102/180. In some cases, sidelink communications may be synchronized with a global navigation satellite system (GNSS) 111, which may be received in signal 113. In other cases, UEs 104, as well as RSUs 107, may transmit an SLSS directly to other UEs, which the other UEs may use for synchronization. The SLSS may have a timing based on GNSS 111, for example. At times, coverage from a GNSS may also be unavailable. Thus, a RSU 107, or other RSSD, may comprise an SLSS component 198 configured to receive, from a first neighbor device, a first SLSS. The RSSD synchronizes in time/frequency with the first neighbor device, and transmits a second SLSS. The second SLSS may be based on a synchronized timing and a synchronized frequency with the first neighbor device. A group of such RSSD may be provided that synchronize with at least one neighbor RSSD in order to provide coordinated synchronization information via SLSS.

Figure 2:
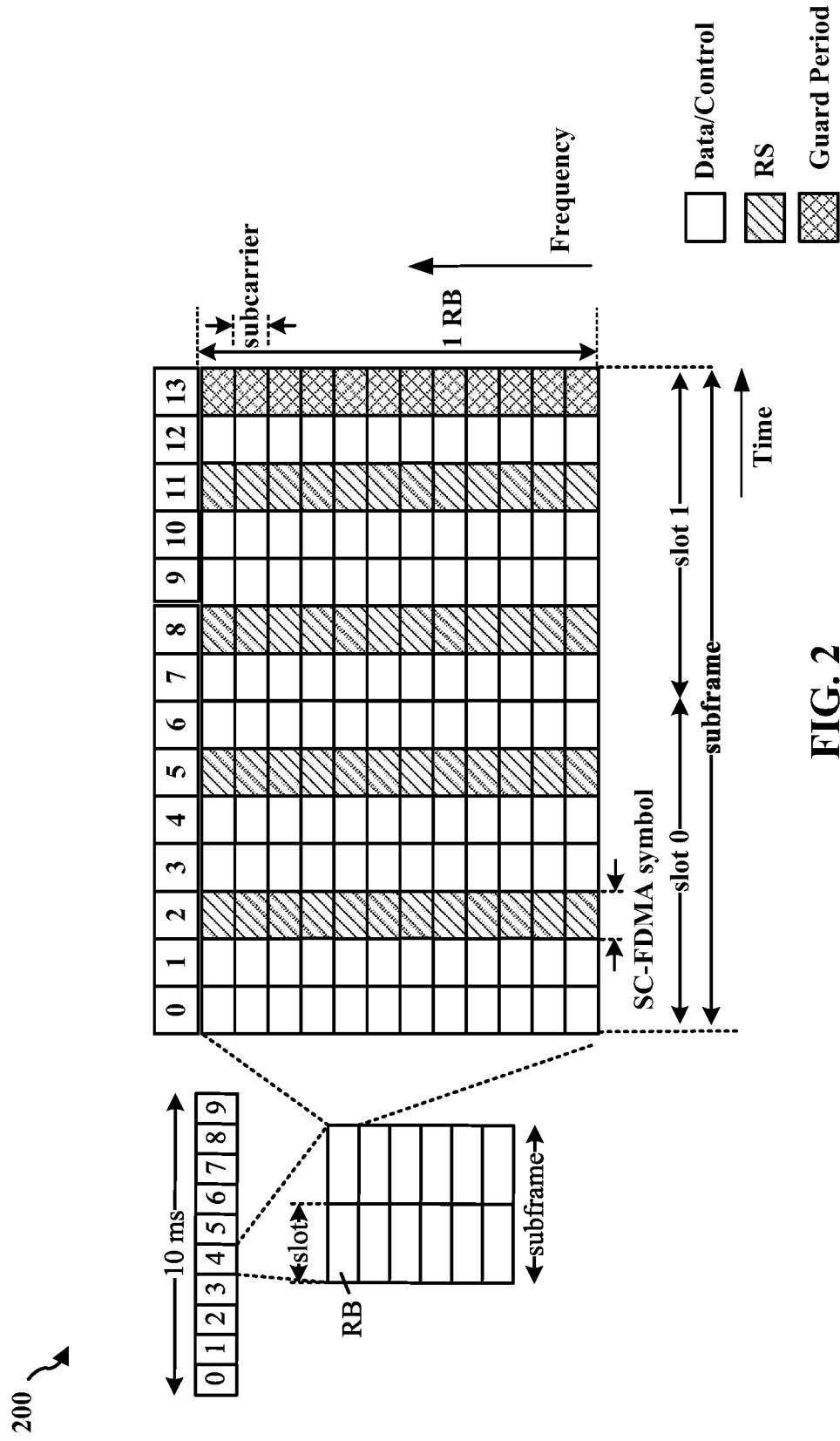
FIG. 2 illustrates an example of a sidelink subframe.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

Figure 3:
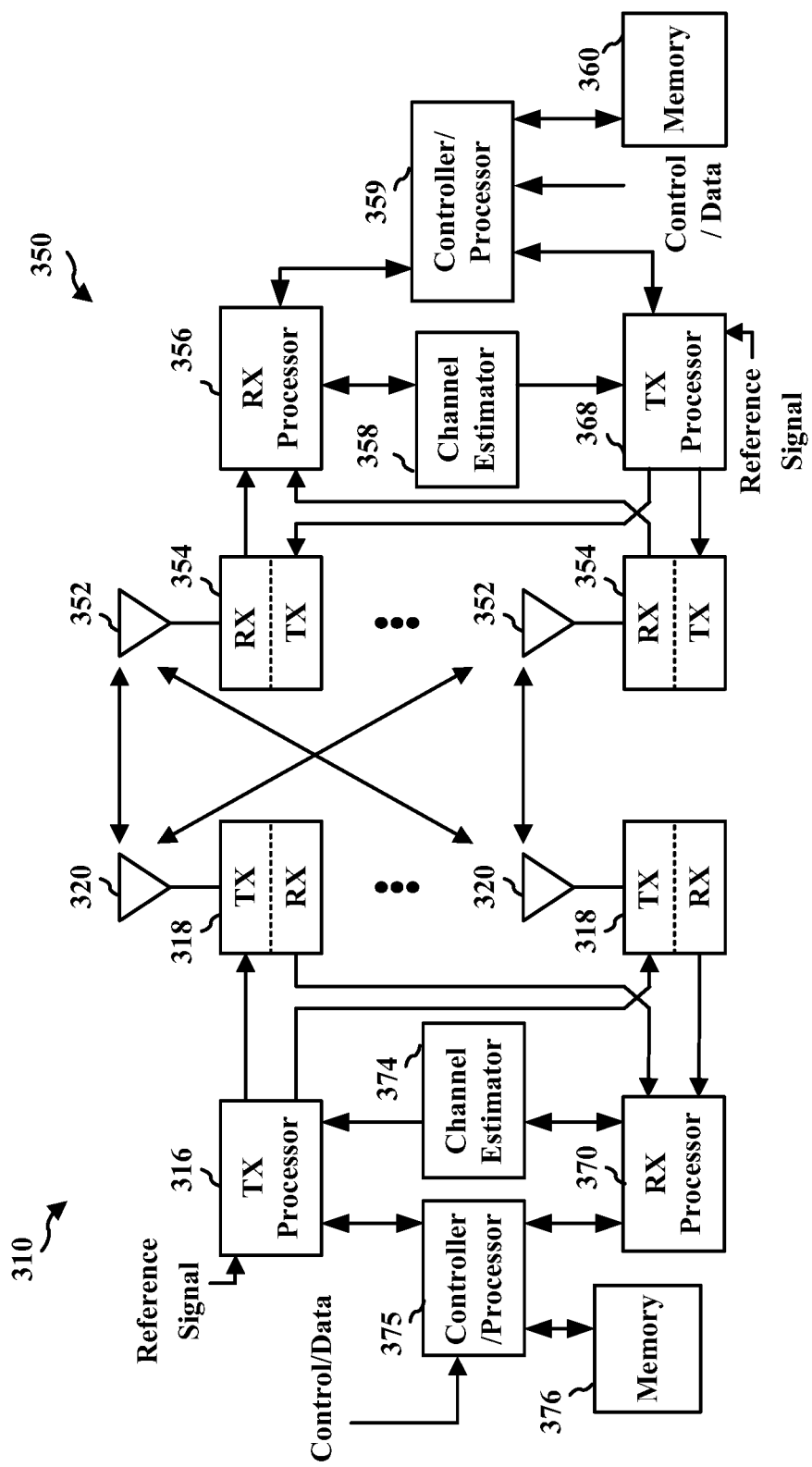
FIG. 3 is a diagram illustrating an example of a first device and a second device involved in wireless communication based, e.g., on V2V, V2X, and/or other D2D communication.

FIG. 3 is a block diagram 300 of a first wireless communication device 310 in communication with a second wireless communication device 350, e.g., via V2V/V2X/D2D communication. The device 310 may comprise a first device communicating directly with a second device, e.g., device 350, via V2V/V2X/D2D communication. The communication may be based, e.g., on sidelink. The first device 310 may comprise a UE, an RSU, an RSSD, etc. The second device may similarly comprise a UE, an RSU, an RSSD, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with the SLSS component 198 of FIG. 1.

V2X communication may enable UEs, such as vehicles, RSUs, and other UEs, to communicate with each other even in the absence of a connection to a cellular network. Such V2X communication may include C-V2X communication. The UEs may synchronize with a network in order to facilitate communication directly with each other. Among other potential synchronization sources, the devices may use a Global Navigation Satellite System (GNSS) signal may be used as a synchronization source by individual UEs. The GNSS may enable the UE to determine a timing and frequency for transmitting/receiving communication with other UEs, RSUs, etc. In some locations, the UE may not be able to reliably receive a GNSS. For example, in tunnels or other areas lacking GNSS coverage, the UE be unable to synchronize in order to participate in V2X communication. Aspects presented herein provide for a sidelink synchronization signal that is coordinated to provide synchronization information to UEs that are in areas lacking GNSS coverage.

Figure 4:
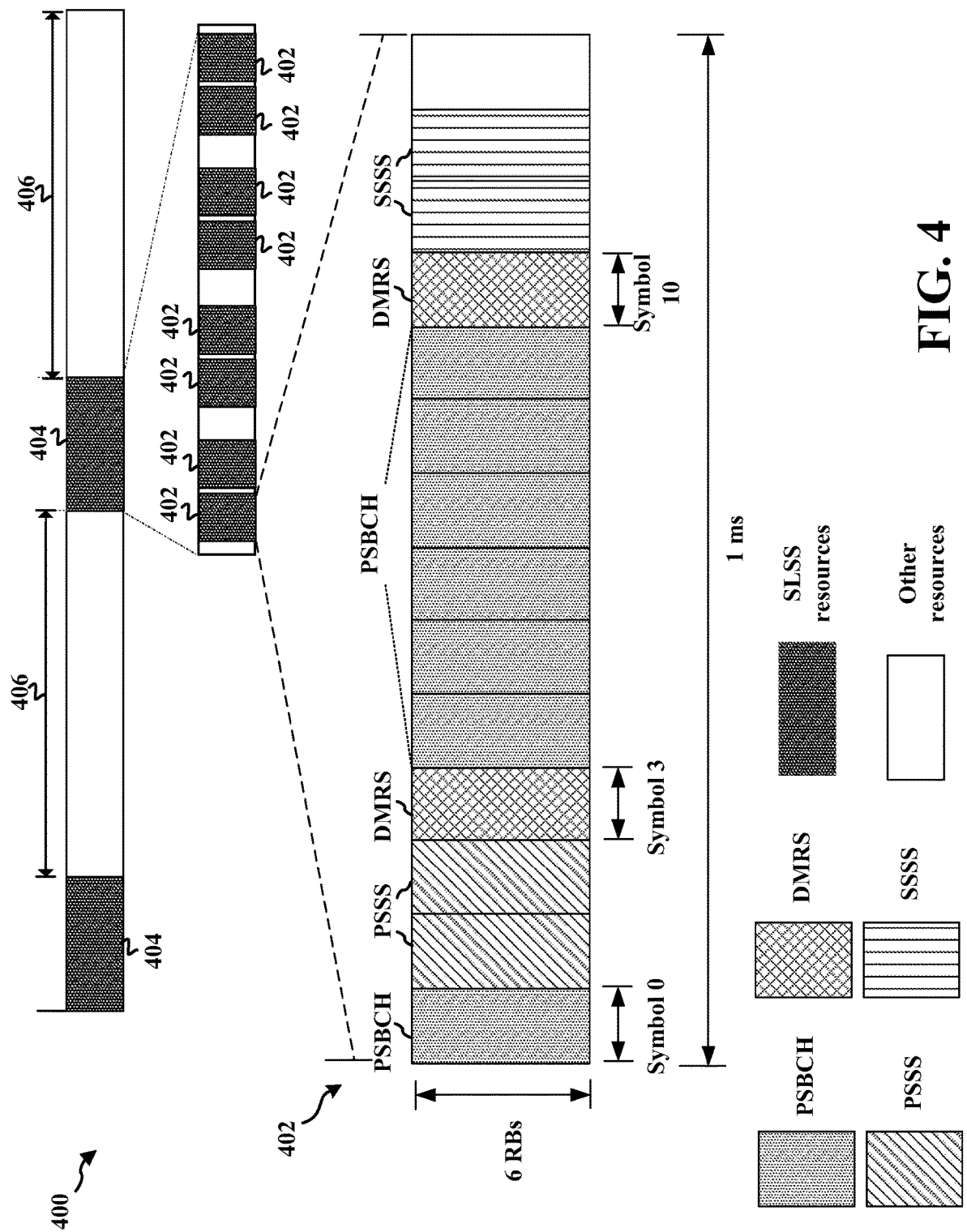
FIG. 4 illustrates example aspects of SLSS.

FIG. 4 illustrates a resource diagram 400 showing example aspects of an SLSS that may be used to synchronize UEs that lack GNSS coverage, or other network coverage, to determine timing and frequency synchronization for V2X communication. The SLSS 402 may be transmitted by a UE 104, a RSU 107, etc. In an aspect, transmission of the SLSS 402. Resources for the SLSS 404 may be scheduled or set aside in a periodic manner, e.g., using a spacing 406 between resources 404 for SLSS 402 transmission/reception. An offset, periodicity, etc. for SLSS resources may be preconfigured so that devices capable of V2X communication are aware of the resources set aside for the SLSS. The devices may avoid transmitting other V2X communication using the SLSS resources. Although the resources for the SLSS 404 are illustrated as being at the start of a period, the SLSS resources may be positioned at any designated time, e.g., with reference to a slot or frame. Within the SLSS resources, the UE or RSU may transmit zero, one, or multiple SLSS 402. In other examples, the SLSS resource may correspond to a size of a single SLSS 402. An SLSS may include multiple synchronization signal resources that a UE may use to transmit different signals comprised within an SLSS. For example, the illustrated SLSS resources includes fourteen synchronization signal resources, which may be referred to by indices 0-13. The synchronization resources may each correspond to a single symbol. The SLSS 400 comprises a Primary Sidelink Synchronization Signal (PSSS) and a Secondary Sidelink Synchronization Signal (SSSS). Additionally, the SLSS may include Physical Sidelink Broadcast Channel (PSBCH) and Demodulation Reference Signal (DMRS). Additionally, a Master Information Block (MIB) may be transmitted in a same subframe in order to provide a System Frame Number (SFN) and other configuration information. It should be understood, however, that the SLSS 402 is one example of many different possible configurations of synchronization information that may be used in connection with the aspects of the present application.

FIG. 5A illustrates an example 500 in which an SLSS 509 may be transmitted by a UE 506 that is within an area of cellular coverage 510 from a base station 504. In FIG. 5A, the UE may receive synchronization information 505 from the base station 504, and may transmit the SLSS 509 using a timing derived from the synchronization information 505 from the base station 504. The UE 506 may transmit the SLSS 509 to a UE 508 that is outside the coverage 510 from the base station 504. Therefore, the UE 508 is able to synchronize with the timing used by the UE 506 even though the UE 508 does not receive the synchronization information from the base station 504. The SLSS 509 enables the UE 506 and the UE 508 to use a synchronized timing and frequency for V2X communication directly between the UE 506 and the UE 508. FIG. 5B illustrates an example 502 in which an SLSS 515 may be transmitted by a UE 514 that is outside of cellular coverage of a base station. The example 502 may also apply to an in-coverage UE that is operating in an scheduling mode that is not under control of a base station or another mode that does not require synchronization with a base station or core network. In FIG. 5B, the UE 514 may receive synchronization information 513 from a GNSS 512. The SLSS 515 transmitted to the UE 516 may use a timing derived from the synchronization information 513 from the GNSS 512. The SLSS 515 enables the UEs 514 and 516 to use a synchronized timing and frequency for V2X communication directly between the UE 514 and the UE 516.

There may be areas having limited GNSS coverage or limited network coverage in which UEs cannot reliably receive synchronization information from a GNSS or other network. For example, UEs in tunnels might not be able to use a GNSS in order to determining timing information in order to synchronize V2X communication with other UEs. Aspects presented herein provide a solution in which synchronization information may be provided within such areas of limited coverage using coordinated SLSS information. For example, road side synchronization devices (RSSDs) may be employed to coordinate SLSS transmission within such an area. An RSSD may comprise a RSU or may comprise other devices capable of communicating based on sidelink. The RSSDs may coordinate SLSS transmission with each other so that each RSSD may synchronize in time and frequency based on an SLSS from a source RSSD and may provide time and frequency information to another RSSD, e.g., in a neighbor RSSD in a different direction than the source RSSD, by transmitting an SLSS that uses timing and frequency synchronized with the source RSSD. A set of RSSDs may derive timing from a root RSSD that determines its timing from a GNSS or other network synchronization signal.

Figure 6:
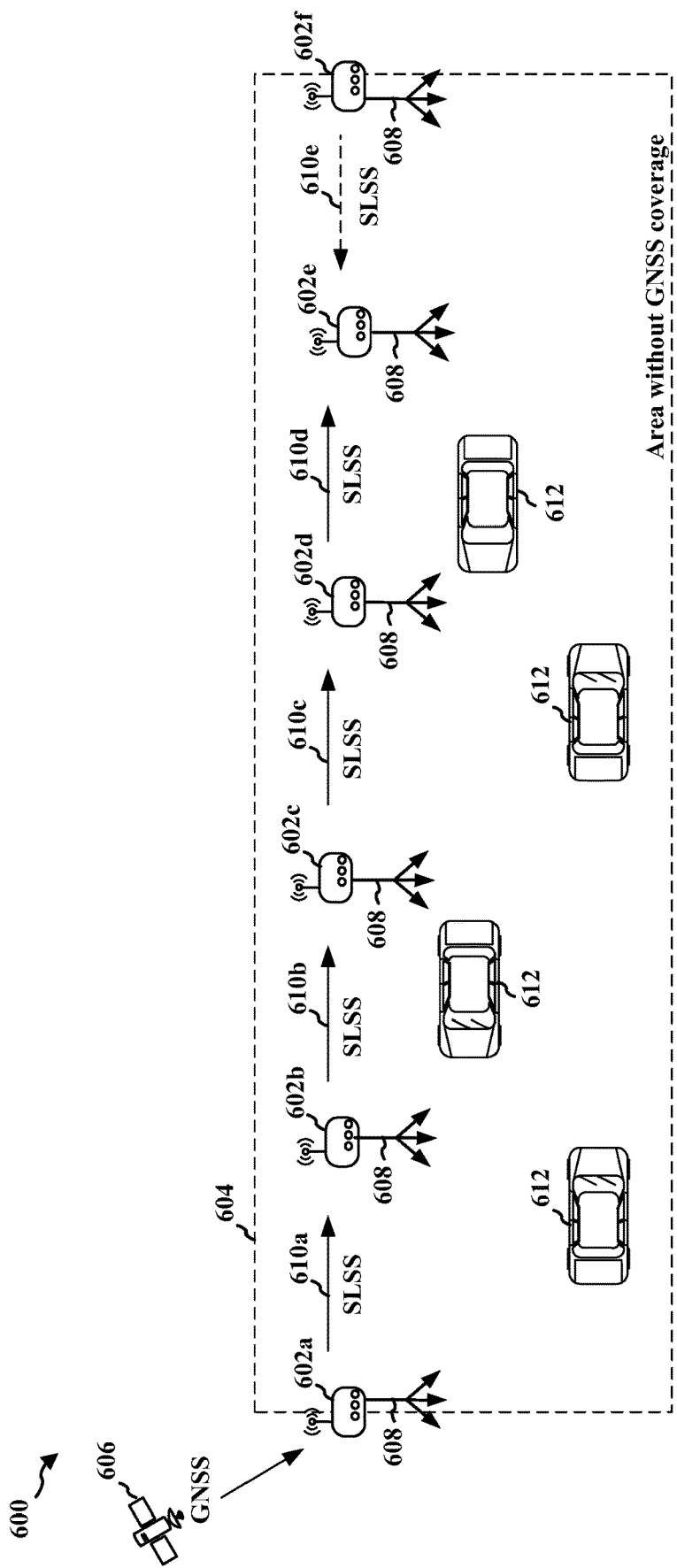
FIG. 6 illustrates an example of coordinated SLSS communication between RSUs.

FIG. 6 illustrates an example 600 having a set of RSUs 602a-f located within an area 604 that has limited, or no, coverage by GNSS 606. Although this example is described for a set of RSUs, the concept presented in FIG. 6 may be employed with other RSSDs, UEs, other V2X devices, or other sidelink devices. In FIG. 6, a first RSU 602a may derive timing based on synchronization information from a GNSS 606. The first RSU 602a may transmit an SLSS 610a, using predefined SLSS resources, to the RSU 602b. The RSU 602b may determine timing information, and may also determine frequency information, based on the SLSS 610a. The RSU 602b determine a propagation delay based on a distance between the RSU 602a and the RSU 602b in order to compensate for the propagation delay in determining the timing and/or frequency. The RSU 602b may transmit an SLSS 610b, using predefined SLSS resources, to the RSU 602c. The RSU 602c may then determine timing information, and may also determine frequency information, based on the SLSS 610b. The RSU 602c may determine a propagation delay based on a distance between the RSU 602b and the RSU 602c in order to compensate for the propagation delay in determining the timing and/or frequency. The RSU 602c may transmit an SLSS 610c, using predefined SLSS resources, to the RSU 602d. The RSU 602d may determine timing information, and may also determine frequency information, based on the SLSS 610c. The RSU 602d may determine a propagation delay based on a distance between the RSU 602c and the RSU 602d in order to compensate for the propagation delay in determining the timing and/or frequency. The RSU 602d may transmit an SLSS 610d, using predefined SLSS resources, to the RSU 602e. The RSU 602e may similarly determining timing information from SLSS 610d and transmit an SLSS to another neighbor RSU. In one example, there may be multiple RSUs within the set that are capable of receiving synchronization information from the GNSS. For example, the RSU 602a and the RSU 602f may be located near ends of a tunnel. Thus, the RSU 602f may be a source RSU that derives timing from the GNSS 606 and transmits the SLSS 610e based on that timing. As both the RSU 602a and the RSU 602f derive timing from the GNSS 606, the RSU 602e may be able to derive related timing information from the SLSS 610d (that is received through a chain of RSUs, e.g., 602a, 602b, 602c, and 602d) and/or from the SLSS 610e that is received directly from a source RSU 602f As a compensation is applied for the propagation delay each time an RSU receives the SLSS and before the RSU transmits its own SLSS, if the RSU 602d and the RSU 602f were equidistant from the RSU 602e, then the RSU 602e may receive the SLSS at the same time. However, if the RSU 602 and the RSU 602f are spaced at different distances from the RSU 602e, then the RSU 602e would be able to distinguish the SLSS 610d from the SLSS 610e as being different signals having different timing delays. Thus, each of the RSUs 602a-602f may be time and frequency synchronized to at least one of its neighboring RSUs. V2X communication, such as SLSS may be broadcast or groupcast and may be received by multiple receiving devices within range of a particular transmitting device, e.g., as illustrated at 608. Thus, the SLSS 610a-e may be received not just by adjacent RSUs, but also by UEs within range of the corresponding RSU. The receiving UE(s) 612 may use the SLSS to synchronize in time and/or frequency, for V2X communication.

The RSUs 602a-602f may be arranged such that each RSU is able to receive signals from its immediate neighboring RSU(s). As well, each RSU may be arranged with equal distance such that the propagation delay from multiple neighbor RSUs are the same. For example, the RSU 602b, 602c, and 602d may be positioned with an equal distance between RSUs so that the RSU 602c receives both the SLSS 610b and the SLSS 610d at the same time, or in an overlapping manner.

Figure 7:
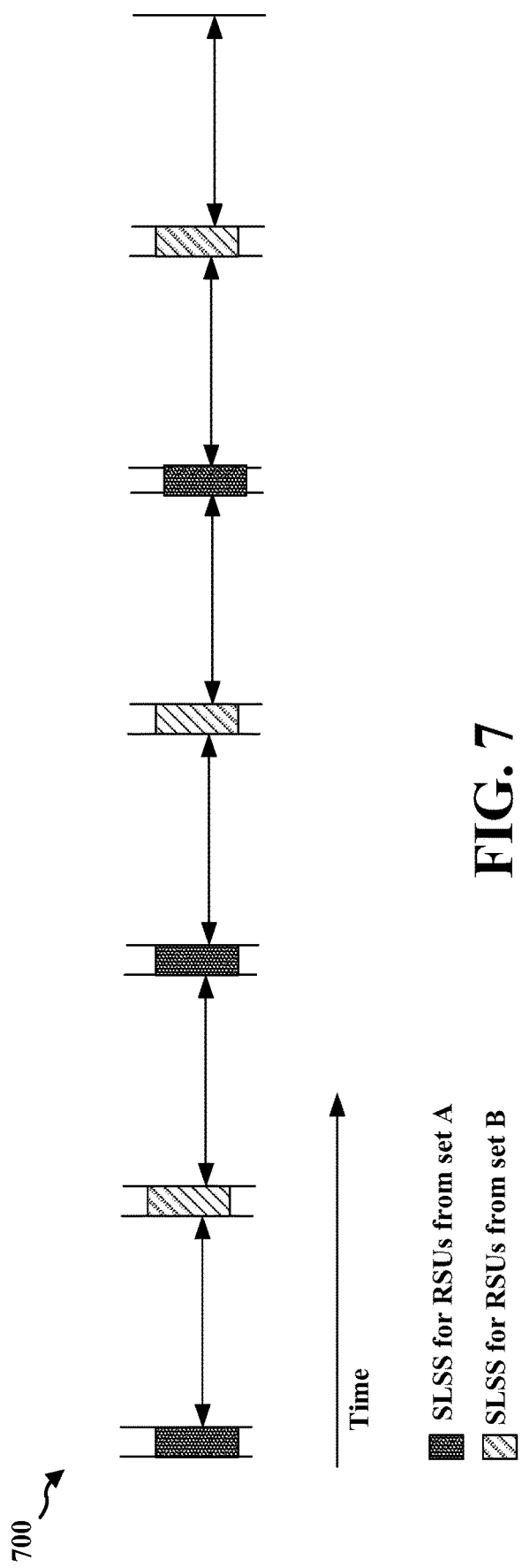
FIG. 7 illustrates an example of multiple sets of SLSS subframes.

Additionally or alternatively, the SLSS resources may be divided into multiple sets, and the different sets may be used in an alternating pattern by the RSUs 602a-602f. For example, the SLSS subframes may be divided into two sets: Set 1 {S0, S2, S4, . . . } and Set 2 {S1, S3, S5, . . . }. A particular RSU may transmit its SLSS using Set 1 and receive SLSS using Set 2. For example, the RSUs 602a, 602c, 602e may transmit SLSS using Set 1, and the RSUs 602b, 602d, 602f may transmit SLSS using Set 2. UE(s) 612 may receive both sets of the SLSSs as a single synchronization source. As one example, the RSUs within the set may be numbered, and even numbered RSUs may transmit in even numbered SLSS subframes while odd numbered RSUs may transmit SLSS in odd numbered SLSS subframes. FIG. 7 illustrates an example 700 of a first set of SLSS resources for a first set of RSUs (set A) and a second set of SLSS resources for a second set of RSUs (set B). The RSUs may be divided into the different sets in an alternating pattern. In the example of FIG. 6, the RSUs 602a, 602c, 602e may be comprised in Set A, while the RSUs 602b, 602d, 602f may be comprised in Set B.

Figure 8:
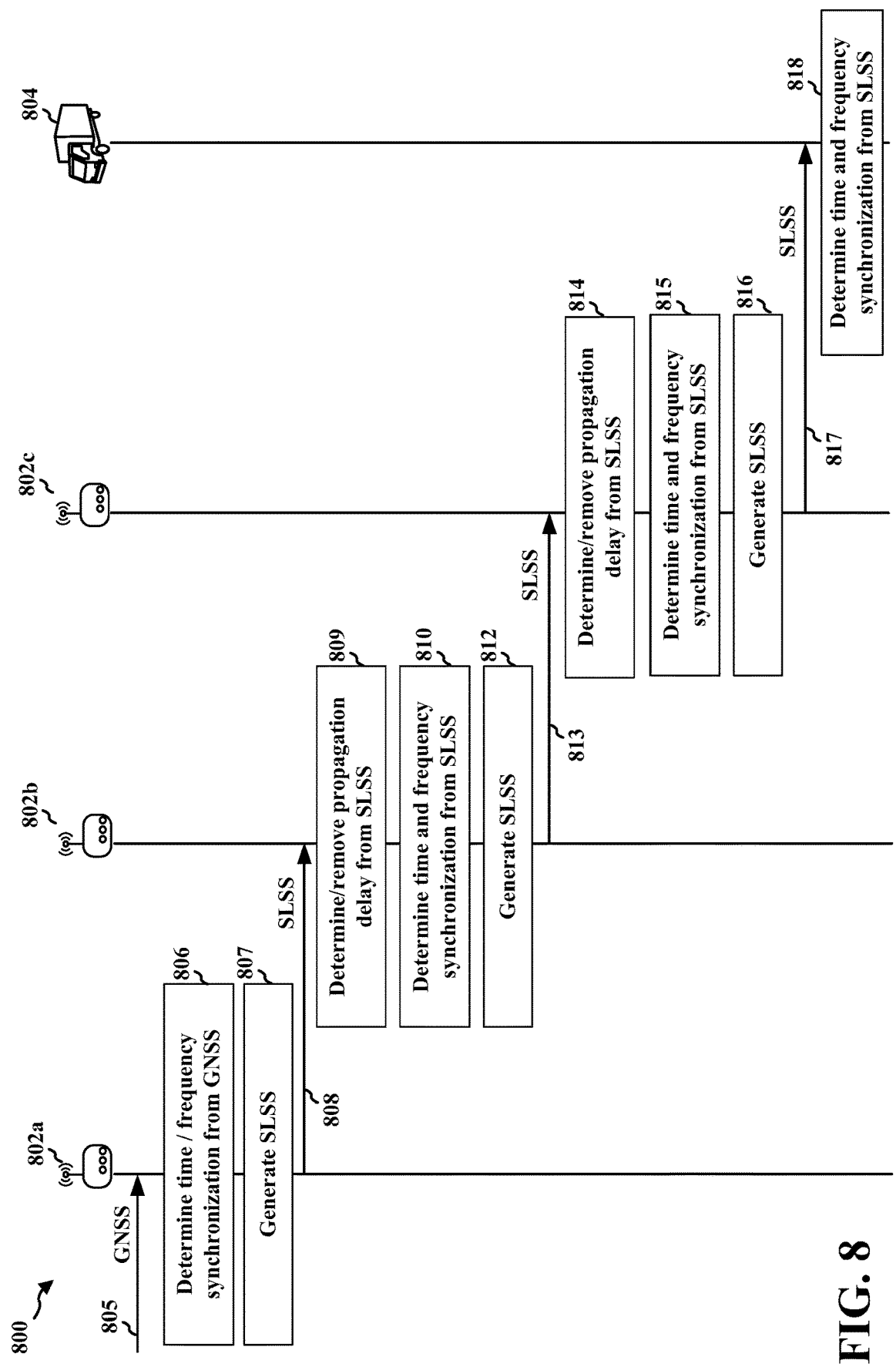
FIG. 8 illustrates an example communication flow between RSUs and a UE.

FIG. 8 illustrates an example communication flow 800 between a group of RSSDs 802a-c that synchronize in time and/or frequency with at least one neighbor RSSD and that transmit SLSS in order to provide synchronization information for V2X communication. The RSSD 802a may receive synchronization information 805 directly from a GNSS. The RSSD 802a may use the synchronization information 805 to determine, at 806, a timing for the SLSS 808. At 807, the RSSD 802a may generate an SLSS having timing derive from the GNSS, and having frequency information. Then, the RSSD 802a may transmit the SLSS 808. The SLSS 808 may be transmitted, e.g., via sidelink based broadcast, multicast, or groupcast in a manner that it can be received by at least one neighboring RSSD 802b. The RSSD 802b may be an immediate neighbor, or an adjacent neighbor, of the RSSD 802a.

The RSSD 802b may use the synchronization information in the SLSS 808 to determine, at 810, to synchronize timing/frequency with the RSSD 802a. In order to accurately synchronize timing/frequency with the RSSD 802a, the RSSD 802b may compensate for a propagation delay, at 809. The RSSD 802b may use a known distance between the RSSD 802a and the RSSD 802b to determine a delay between transmission of the SLSS 808 from the RSSD 802a and reception of the SLSS 808 at the RSSD 802b. For example, the RSSD 802b may calculate $T_b = T_a - T_{propagation}$, where $T_b$ corresponds to a start time of a subframe, and $T_a$ corresponds to a start time of the same subframe detected from the SLSS 808 from the RSSD 802a. $T_{propagation} = distance_{ab}/c$, where $distance_{ab}$ corresponds to a distance between the RSSD 802a and the RSSD 802b and c corresponds to the speed of light. An RSSD may know a distance, or be provided with information about a distance, to the other RSSD in the group. In another example, an RSSD may know or be provided distance information for the RSSD's immediate neighbors in the group, e.g., with which the RSSD will exchange the SLSS. The RSSD 802b may remove the propagation delay, or otherwise compensate for the propagation delay, in generating an SLSS, at 812, using synchronized time/frequency with the RSU 802a. The RSSD 802b may transmit the SLSS 813 to the RSSD 802c. The SLSS 813 may be transmitted, e.g., via sidelink based broadcast, multicast, or groupcast in a manner that it can be received by at least one neighboring RSSD 802c. The RSSD 802c may be an immediate neighbor, or an adjacent neighbor, of the RSSD 802b.

Similar to the description of the RSSD 802b, the RSSD 802c may receive the SLSS 813, compensate for a propagation delay at 814, synchronize in time/frequency with the RSSD 802b at 815, generate an SLSS at 816, and transmit the SLSS 817. Although this example, illustrates three RSSDs, an area may be covered by any number of RSSDs in order to provide synchronization information via SLSS when a GNSS, or other network synchronization information, is not available. A UE in limited coverage, such as a vehicle traveling through a tunnel, may receive an SLSS from any of the RSSD 802a, 802b, or 802c. While the UE 804 is illustrated as receiving the SLSS 817, the UE 804 may receive any of the SLSSs 808, 813, or 817 for which the UE 804 is within range of the transmitting RSSD. At 818, the UE 804 may use the SLSS 817 to determine time and frequency synchronization, e.g., for use in transmitting and receiving other V2X communication. The UE 804 may synchronize in time/frequency based on the received SLSS in order transmit or receive communication with other UEs, with RSUs, etc.

Figure 9:
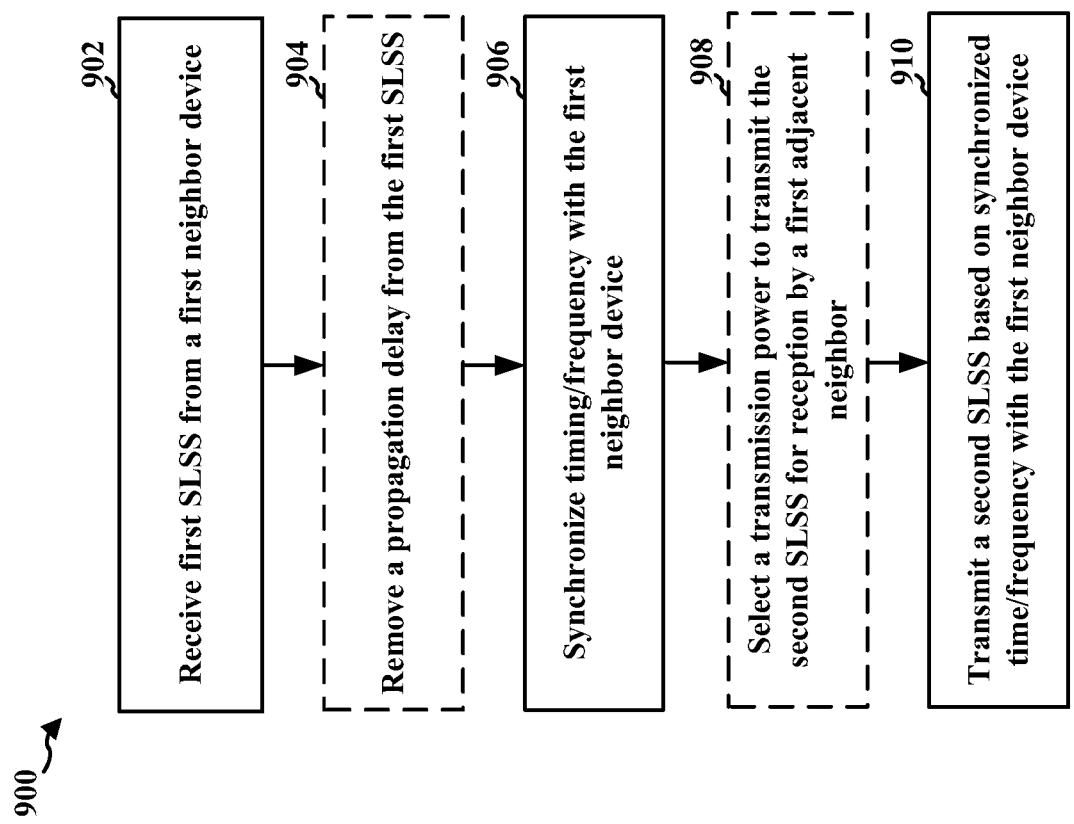
FIG. 9 is a flowchart of a method of wireless communication.

FIG. 9 is a flowchart 900 of a method of wireless communication. The method may be performed by an RSSD or a component of an RSSD, e.g., by an RSU or other such device capable of communicating using sidelink, or V2X based communication (e.g., RSU 107, device 310 or 350, RSU 602a-f, RSSD 802a-c, the apparatus 1002, 1002'; the processing system 1114, etc.). Optional aspects are presented with a dashed line. The method improves synchronization, e.g., for V2X communication, even in areas in which UEs have limited ability to synchronize with a GNSS or other network synchronization information.

At 902, the RSSD receives, from a first neighbor device, a first SLSS. The reception may be performed, e.g., by the reception component and/or the first SLSS component 1008 of the apparatus 1002 in FIG. 10. FIG. 4 illustrates aspects of an example, SLSS may that be received from the first neighbor device. The first neighbor device may correspond to one of RSU 602a-f or any of RSSD 802a or 802b.

As illustrated at 904, the RSSD may remove a propagation delay from the first SLSS to synchronize the timing and the frequency with the first neighbor device. The removal may be performed, e.g., by the propagation delay component 1010 of the apparatus 1002 in FIG. 10. The propagation delay may be removed from a transmit timing of the first SLSS or the second SLSS based on a distance from the RSSD to at least the first neighbor device or a second neighbor device. Example aspects of removal of a propagation delay are described in connection with 809 in FIG. 8.

At 906, the RSSD synchronizes a timing and a frequency with the first neighbor device. The synchronization may be performed, e.g., by the synchronization component 1012 of the apparatus 1002 in FIG. 10. The timing of the first SLSS may derived from a GNSS signal. The timing of the first SLSS may be derived from a GNSS signal that is received, e.g., directly, by the first neighbor device. For example, the RDSD may correspond to RSSD 802b and the first neighbor device may correspond to RSSD 802a. Thus, the timing of the first SLSS may be derived from a third SLSS having the timing based on the GNSS signal. For example, the RSSD may correspond to RSU 602c, 602d, 602e, which receives an SLSS that is based on at least one SLSS from other RSU's having a root SLSS 610a that is based directly on a GNSS signal.

At 910, the RSSD transmits a second SLSS, wherein the second SLSS is based on a synchronized timing and a synchronized frequency with the first neighbor device. The transmission may be performed, e.g., by the second SLSS component and/or the transmission component 1006 of the apparatus 1002 in FIG. 10. The RSSD may transmit the SLSS to a second neighbor device, e.g., as part of a coordinated group of RSSD. The SLSS may be broadcast, multicast, groupcast, etc. so that the SLSS may be received by neighboring RSSD and/or UEs.

As illustrated at 908, the RSSD may select a transmission power to transmit the second SLSS for reception by a first adjacent neighbor device. The selection may be performed, e.g., by the transmission power component 1016 of the apparatus 1002 in FIG. 10. The transmission power may be selected so that the SLSS is received by adjacent/immediate neighbors and so that an RSSD beyond the immediate/adjacent neighbor would receive a significantly stronger signal from its own immediate neighbor RSSD in comparison to an RSSD that is not an adjacent/immediate neighbor RSSD.

Preconfigured SLSS subframes may be divided into at least a first set of SLSS subframes and a second set of SLSS subframes. The RSSD may receive SLSS signals in the first set of SLSS subframes transmitted by at least one immediate neighbor RSSD and transmits the second SLSS in the second set of SLSS subframes. FIG. 7 illustrates an example of SLSS resources divided into two sets.

The RSSD may be comprised in a group of RSSDs, e.g., as described in connection with FIGS. 6 and 8, using the synchronized timing and the synchronized frequency based on SLSS communicated between adjacent neighbor RSSDs comprised in the group of RSSDs. The group of RSSDs may comprise an alternating pattern of RSSDs in first set of RSSDs and a second set of RSSDs. The preconfigured SLSS subframes may be divided into at least a first set of SLSS subframes and a second set of SLSS subframes based on the alternating pattern of RSSDs, and the first set of RSSDs may transmit the first SLSS using the first set of SLSS subframes and the second set of RSSDs may transmit the second SLSS using the second set of SLSS subframes. FIG. 7 illustrates an example of SLSS resources divided into two sets.

Figure 10:
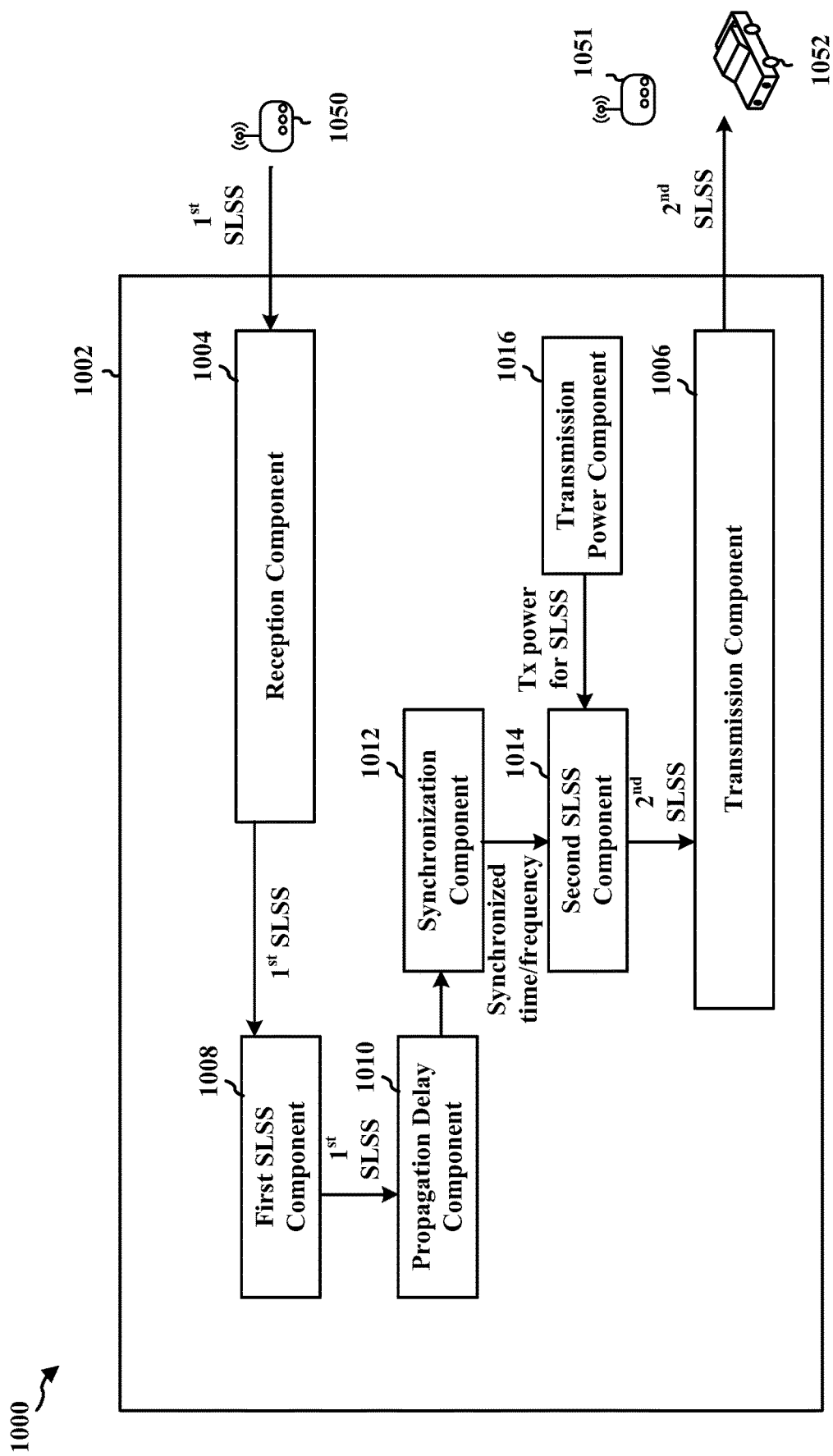
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be an RSSD or a component of an RSSD. An example of an RSSD may include an RSU, for example. The apparatus includes a reception component 1004 that receives wireless communication, e.g., including communication based on sidelink, a transmission component 1006 that transmits wireless communication, e.g., including communication based on sidelink. The apparatus may include a first SLSS component 1008 configured to receive, from a first neighbor device 1050, a first SLSS, e.g. as described in connection with 902. The apparatus may include a synchronization component 1012 configured to synchronize a timing and a frequency with the first neighbor device 1050, e.g. as described in connection with 906. The apparatus may include a second SLSS component 1014 configured to transmitting a second SLSS, wherein the second SLSS is based on a synchronized timing and a synchronized frequency with the first neighbor device, e.g. as described in connection with 910. The second SLSS may be received by another neighbor device 1051 and/or a UE 1052. The apparatus may include a transmission power component 1016 configured to select a transmission power to transmit the second SLSS for reception by a first adjacent neighbor device 1051, e.g. as described in connection with 908. The apparatus may include a propagation delay component 1010 configured to remove a propagation delay from the first SLSS to synchronize the timing and the frequency with the first neighbor device, e.g. as described in connection with 904.

The apparatus may include additional components that perform each of the blocks of the algorithm in the aforementioned flowcharts of FIGS. 8 and 9. As such, each block in the aforementioned flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
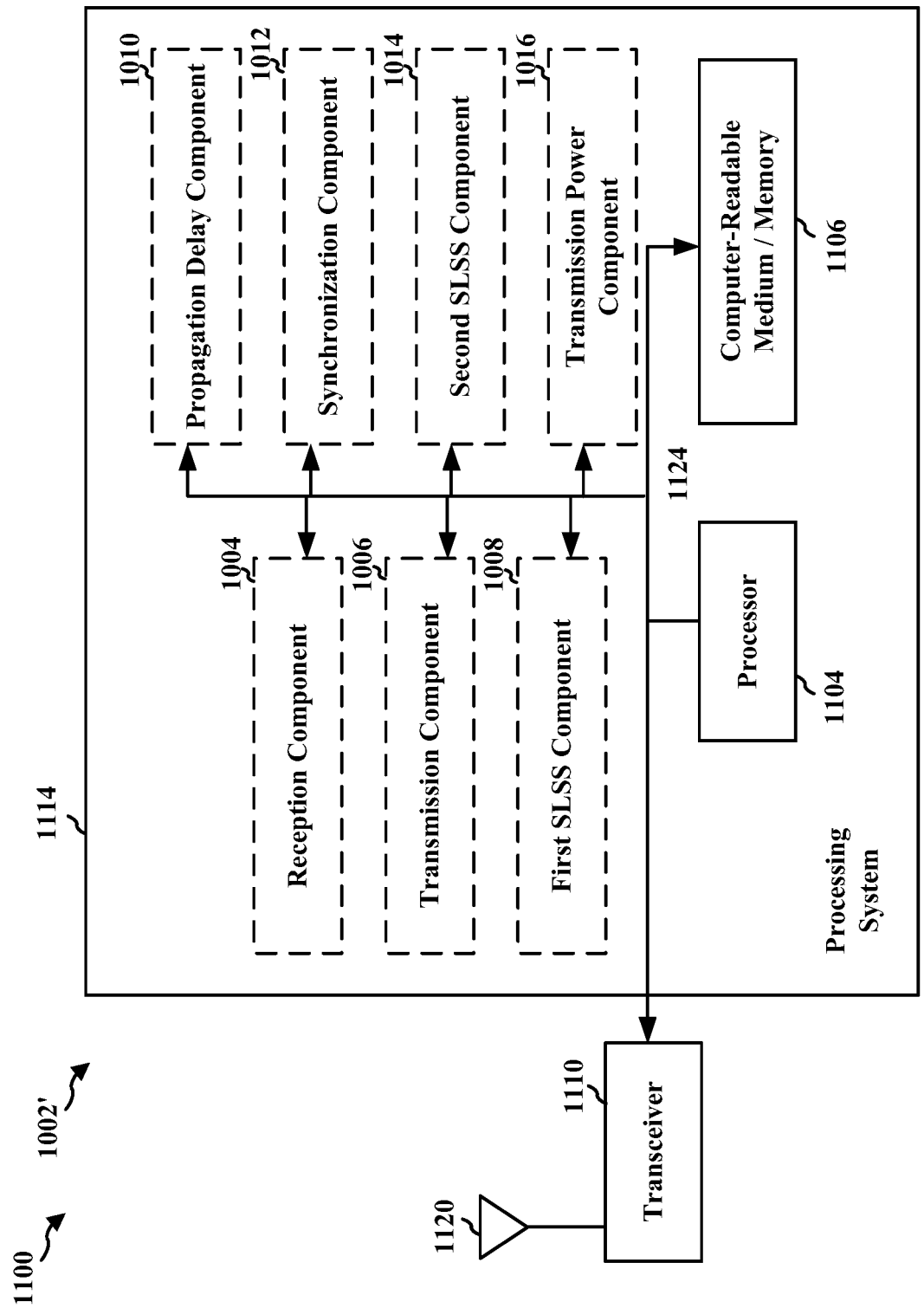
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016. The components may be software components running in the processor 1104, resident/stored in the computer readable medium/memory 1106, one or more hardware components coupled to the processor 1104, or some combination thereof. The processing system 1114 may be a component of the device 310 or the device 350 and may include the memory 376, 360 and/or at least one of the TX processor 316, 368, the RX processor 370, 356, and the controller/processor 375, 359.

In one configuration, the apparatus 1202/1202' for wireless communication includes means for receiving, from a first neighbor device, a first SLSS; means for synchronizing a timing and a frequency with the first neighbor device; means for transmitting a second SLSS, wherein the second SLSS is based on a synchronized timing and a synchronized frequency with the first neighbor device; means for selecting a transmission power to transmit the second SLSS for reception by a first adjacent neighbor device; and means for removing a propagation delay from the first SLSS to synchronize the timing and the frequency with the first neighbor device. The aforementioned means may be one or more of the aforementioned components of the apparatus 1002 and/or the processing system 1114 of the apparatus 1002' configured to perform the functions recited by the aforementioned means. As described supra, the processing system 1114 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and aspects thereof may be combined with aspects of other embodiments or teaching described herein, without limitation.

Example 1 is a method of at a RSSD, comprising: receiving, from a first neighbor device, a first SLSS; synchronizing a timing and a frequency with the first neighbor device; and transmitting a second SLSS, wherein the second SLSS is based on a synchronized timing and a synchronized frequency with the first neighbor device.

In Example 2, the method of Example 1 further includes selecting a transmission power to transmit the second SLSS for reception by a first adjacent neighbor device.

In Example 3, the method of Example 1 or Example 2 further includes that the timing of the first SLSS is derived from a GNSS signal.

In Example 4, the method of any of Examples 1-3 further includes that the timing of the first SLSS is derived from the GNSS signal that is received by the first neighbor device.

In Example 5, the method of any of Examples 1-3 further includes that the timing of the first SLSS is derived from a third SLSS having the timing based on the GNSS signal.

In Example 6, the method of any of Examples 1-5 further includes that preconfigured SLSS subframes are divided into at least a first set of SLSS subframes and a second set of SLSS subframes, wherein the RSSD receives SLSS signals in the first set of SLSS subframes transmitted by at least one immediate neighbor RSSD and transmits the second SLSS in the second set of SLSS subframes.

In Example 7, the method of any of Examples 1-6 further includes that the RSSD is comprised in a group of RSSDs using the synchronized timing and the synchronized frequency based on SLSS communicated between adjacent neighbor RSSDs comprised in the group of RSSDs.

In Example 8, the method of any of Examples 1-7 further includes that the group of RSSDs comprises an alternating pattern of RSSDs in first set of RSSDs and a second set of RSSDs, wherein preconfigured SLSS subframes are divided into at least a first set of SLSS subframes and a second set of SLSS subframes based on the alternating pattern of RSSDs, and wherein the first set of RSSDs transmit the first SLSS using the first set of SLSS subframes and the second set of RSSDs transmit the second SLSS using the second set of SLSS subframes.

In Example 9, the method of any of Examples 1-8 further comprises removing a propagation delay from the first SLSS to synchronize the timing and the frequency with the first neighbor device.

In Example 10, the method of any of Examples 1-9 further includes that the propagation delay is removed from a transmit timing of the first SLSS or the second SLSS based on a distance from the RSSD to at least the first neighbor device or a second neighbor device.

Example 11 is a device including one or more processors and one or more memories in electronic communication with the one or more processors storing instructions executable by the one or more processors to cause the device to implement a method as in any of Examples 1-10.

Example 12 is a system or apparatus including means for implementing a method or realizing an apparatus as in any of Examples 1-10.

Example 13 is a non-transitory computer readable medium storing instructions executable by one or more processors to cause the one or more processors to implement a method as in any of Examples 1-10.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a Road Side Synchronization Device (RSSD), comprising:
receiving, from a first neighbor device, a first Sidelink Synchronization Signal (SLSS);
synchronizing a timing and a frequency with the first neighbor device; and
transmitting a second SLSS, wherein the second SLSS is based on a synchronized timing and a synchronized frequency with the first neighbor device.

2. The method of claim 1, further comprising:
selecting a transmission power to transmit the second SLSS for reception by a first adjacent neighbor device.

3. The method of claim 1, wherein the timing of the first SLSS is derived from a Global Navigation Satellite System (GNSS) signal.

4. The method of claim 3, wherein the timing of the first SLSS is derived from the GNSS signal that is received by the first neighbor device.

5. The method of claim 3, wherein the timing of the first SLSS is derived from a third SLSS having the timing based on the GNSS signal.

6. The method of claim 1, wherein preconfigured SLSS subframes are divided into at least a first set of SLSS subframes and a second set of SLSS subframes,
wherein the RSSD receives SLSS signals in the first set of SLSS subframes transmitted by at least one immediate neighbor RSSD and transmits the second SLSS in the second set of SLSS subframes.

7. The method of claim 1, wherein the RSSD is comprised in a group of RSSDs using the synchronized timing and the synchronized frequency based on SLSS communicated between adjacent neighbor RSSDs comprised in the group of RSSDs.

8. The method of claim 7, wherein the group of RSSDs comprises an alternating pattern of RSSDs in first set of RSSDs and a second set of RSSDs, wherein preconfigured SLSS subframes are divided into at least a first set of SLSS subframes and a second set of SLSS subframes based on the alternating pattern of RSSDs, and wherein the first set of RSSDs transmit the first SLSS using the first set of SLSS subframes and the second set of RSSDs transmit the second SLSS using the second set of SLSS subframes.

9. The method of claim 1, further comprising:
removing a propagation delay from the first SLSS to synchronize the timing and the frequency with the first neighbor device.

10. The method of claim 9, wherein the propagation delay is removed from a transmit timing of the first SLSS or the second SLSS based on a distance from the RSSD to at least the first neighbor device or a second neighbor device.

11. An apparatus for wireless communication at a Road Side Synchronization Device (RSSD), comprising:
a memory; and
at least one processor coupled to the memory and configured to:
receive, from a first neighbor device, a first Sidelink Synchronization Signal (SLSS);
synchronize a timing and a frequency with the first neighbor device; and
transmit a second SLSS, wherein the second SLSS is based on a synchronized timing and a synchronized frequency with the first neighbor device.

12. The apparatus of claim 11, wherein the at least one processor is further configured to:
select a transmission power to transmit the second SLSS for reception by a first adjacent neighbor device.

13. The apparatus of claim 11, wherein the timing of the first SLSS is derived from a Global Navigation Satellite System (GNSS) signal.

14. The apparatus of claim 13, wherein the timing of the first SLSS is derived from the GNSS signal that is received by the first neighbor device.

15. The apparatus of claim 13, wherein the timing of the first SLSS is derived from a third SLSS having the timing based on the GNSS signal.

16. The apparatus of claim 11, wherein preconfigured SLSS subframes are divided into at least a first set of SLSS subframes and a second set of SLSS subframes,
wherein the RSSD receives SLSS signals in the first set of SLSS subframes transmitted by at least one immediate neighbor RSSD and transmits the second SLSS in the second set of SLSS subframes.

17. The apparatus of claim 11, wherein the RSSD is comprised in a group of RSSDs using the synchronized timing and the synchronized frequency based on SLSS communicated between adjacent neighbor RSSDs comprised in the group of RSSDs.

18. The apparatus of claim 17, wherein the group of RSSDs comprises an alternating pattern of RSSDs in first set of RSSDs and a second set of RSSs, wherein preconfigured SLSS subframes are divided into at least a first set of SLSS subframes and a second set of SLSS subframes based on the alternating pattern of RSSDs, and wherein the first set of RSSDs transmit the first SLSS using the first set of SLSS subframes and the second set of RSSDs transmit the second SLSS using the second set of SLSS subframes.

19. The apparatus of claim 11, wherein the at least one processor is further configured to:
remove a propagation delay from the first SLSS to synchronize the timing and the frequency with the first neighbor device.

20. The apparatus of claim 19, wherein the propagation delay is removed from a transmit timing of the first SLSS or the second SLSS based on a distance from the RSSD to at least the first neighbor device or a second neighbor device.

21. An apparatus for wireless communication at a Road Side Synchronization Device (RSSD), comprising:
means for receiving, from a first neighbor device, a first Sidelink Synchronization Signal (SLSS);
means for synchronizing a timing and a frequency with the first neighbor device; and
means for transmitting a second SLSS, wherein the second SLSS is based on a synchronized timing and a synchronized frequency with the first neighbor device.

22. The apparatus of claim 21, further comprising:
means for selecting a transmission power to transmit the second SLSS for reception by a first adjacent neighbor device.

23. The apparatus of claim 21, wherein the timing of the first SLSS is derived from a Global Navigation Satellite System (GNSS) signal.

24. The apparatus of claim 23, wherein the timing of the first SLSS is derived from the GNSS signal that is received by the first neighbor device.

25. The apparatus of claim 23, wherein the timing of the first SLSS is derived from a third SLSS having the timing based on the GNSS signal.

26. The apparatus of claim 21, wherein preconfigured SLSS subframes are divided into at least a first set of SLSS subframes and a second set of SLSS subframes,
wherein the RSSD receives SLSS signals in the first set of SLSS subframes transmitted by at least one immediate neighbor RSSD and transmits the second SLSS in the second set of SLSS subframes.

27. The apparatus of claim 21, wherein the RSSD is comprised in a group of RSSDs using the synchronized timing and the synchronized frequency based on SLSS communicated between adjacent neighbor RSSDs comprised in the group of RSSDs.

28. The apparatus of claim 27, wherein the group of RSSDs comprises an alternating pattern of RSSDs in first set of RSSDs and a second set of RSSDs, wherein preconfigured SLSS subframes are divided into at least a first set of SLSS subframes and a second set of SLSS subframes based on the alternating pattern of RSSDs, and wherein the first set of RSSDs transmit the first SLSS using the first set of SLSS subframes and the second set of RSSDs transmit the second SLSS using the second set of SLSS subframes.

29. The apparatus of claim 21, further comprising:
means for removing a propagation delay from the first SLSS to synchronize the timing and the frequency with the first neighbor device.

30. A non-transitory computer-readable medium storing computer executable code for wireless communication at a Road Side Synchronization Device (RSSD), the code when executed by a processor cause the processor to:
receive, from a first neighbor device, a first Sidelink Synchronization Signal (SLSS);
synchronize a timing and a frequency with the first neighbor device; and
transmit a second SLSS, wherein the second SLSS is based on a synchronized timing and a synchronized frequency with the first neighbor device.

\* \* \* \* \*